Dec. 12, 1933.  S. A. SIMMONS  1,938,938
DRAFT APPLIANCE FOR AGRICULTURAL MACHINERY AND IMPLEMENTS
Filed May 11, 1932  2 Sheets-Sheet 2
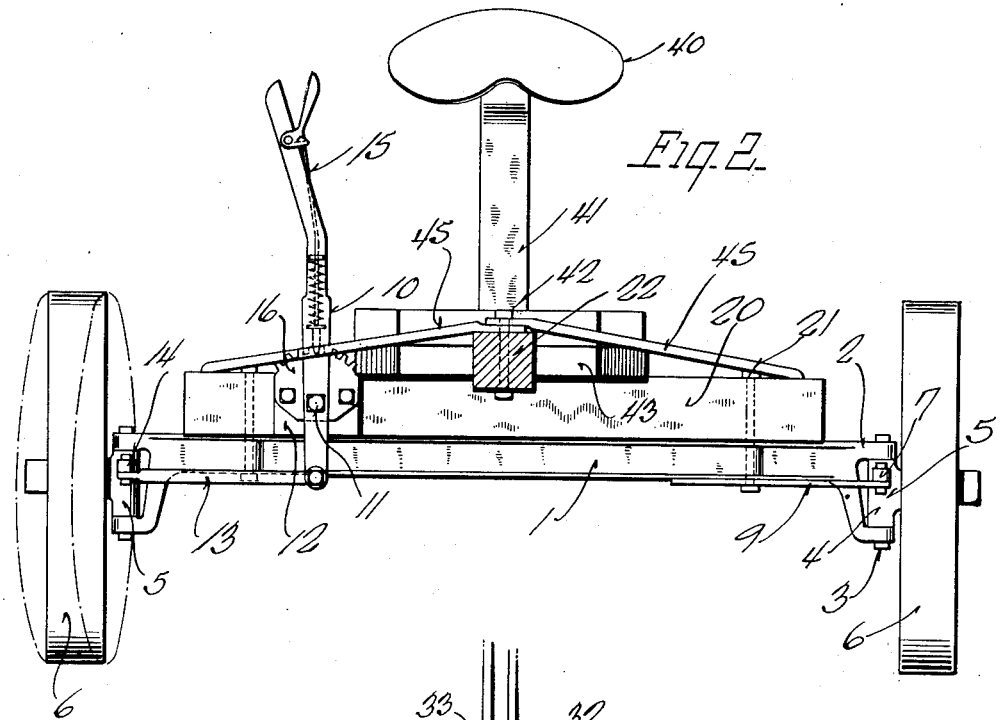
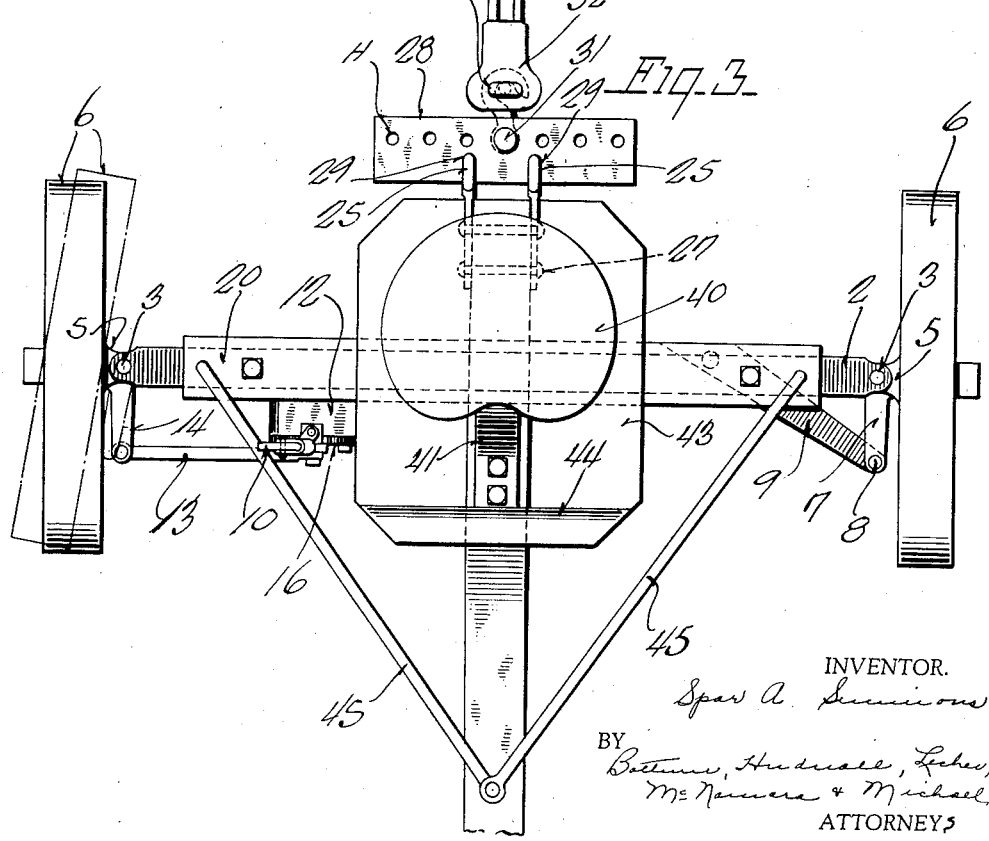
INVENTOR.
Spar A. Simmons
BY
ATTORNEYS Patented Dec. 12, 1933

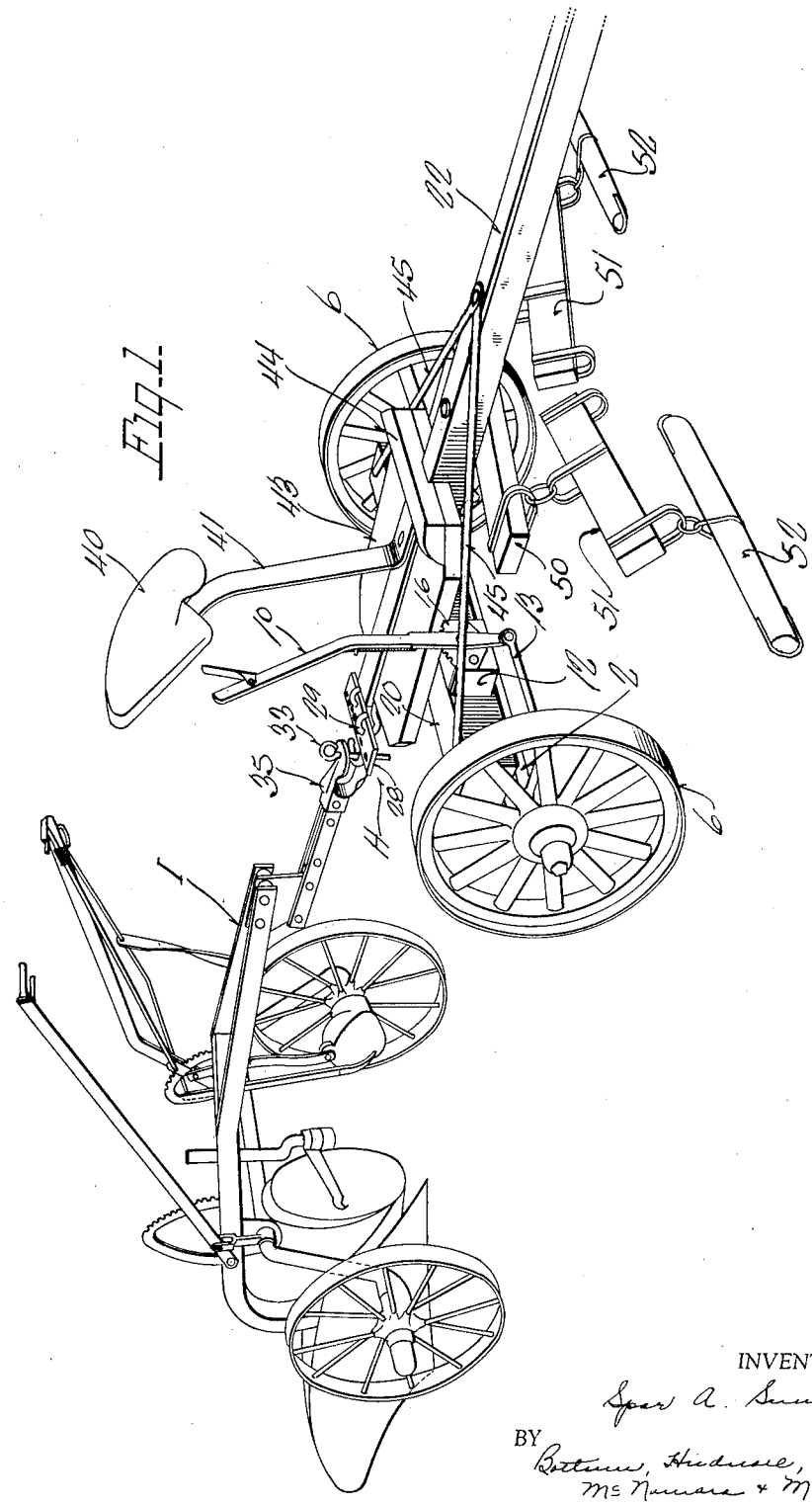

1,938,938

UNITED STATES PATENT OFFICE 1,938,938

DRAFT APPLIANCE FOR AGRICULTURAL MACHINERY AND IMPLEMENTS

Spar A. Simmons, Viola, Wis.

Application May 11, 1932. Serial No. 610,538

3 Claims. (Cl. 280—82)

This invention relates in general to an improvement in agricultural machinery and more particularly to an improvement in a draft appliance or hitch cart.

One of the objects of the invention is to provide a device of this character which facilitates the use of horses for pulling agricultural implements of the type designed for use with tractors. The machine is capable of advantageous use with practically all types of agricultural implements, for example, plows, harrows, drags, cultipackers, quack grass diggers, binders, or the like.

Under some conditions the ordinary type of horse-drawn plow is not capable of effecting suitable plowing and it is desirable to use the tractor type of plow or the like and yet it is not convenient or practical to use the tractor but rather to utilize horses for pulling the implement. The present invention is advantageous under such circumstances for the reason that it facilitates the use of horses for pulling the tractor types of implements.

Under present economic conditions, especially in the farming field, it is becoming increasingly difficult or impossible for farmers to purchase new tractors when the tractors that they have been using during the past year wear out. The trend therefore has returned to horses for pulling agricultural machinery. The farmers have on hand, however, the tractor types of plows or other implements and such implements are preferred by the farmers over the old horse-drawn type of plow or the like. The difficulty has been, however, in the provision of a suitable means which enables the use of horses for pulling the tractor type of implement. These implements generally require the use of two or more horses and difficulty is encountered in establishing a practical operative and effective organization of the draft appliances such as the double trees, single trees, equalizers, etc. with the agricultural implement. The present invention provides a mounting for these draft appliances and for their effective connection with the implements and does this in a manner which facilitates the farmer's control over the horses and over the farming operation and at the same time enhances his comfort in that it places him ahead of the implement and consequently ahead of the dust and dirt raised as an incident to the operation.

Another object of the invention is the provision of a machine of this character which is capable of effective use on uneven ground or on a hillside, the machine being capable of adjustment to compensate for the unevenness or the slope of the hillside and to insure a well plowed straight furrow.

Another advantage of the machine embodying the present invention is that when the draft appliances are set up and adjusted to suit the method of hitching up the horses, the farmer can change from one implement to another without disturbing the set-up.

Another object is to provide a machine of this character which, in general, is of simple and durable construction, reliable, effective and convenient in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing a machine embodying the present invention connected up with one type of agricultural implement;

Figure 2 is a view in vertical section taken in front of Figure 3; and

Figure 3 is a fragmentary view in top plan of the hitch cart shown in Figure 1.

Referring to the drawings, it will be seen that the machine embodying the present invention is made up of a main axle 1, which, if desired, may be constructed of two parts or sections adjustable with respect to each other and equipped with suitable fasteners for securing the sections in any adjustment. For the sake of simplicity in illustration, however, the main axle 1 is shown as being constructed of a single piece of metal, the ends of which are formed with yokes which have their opposed portions apertured to receive the spindles 3 extending through the vertical bearings 4 of stub axles 5. Ground wheels 6 are rotatably mounted on the stub axles 5 in the usual manner. With this construction, the wheels may not only rotate as the machine is advanced over the ground but they may be turned or swung in a vertical plane at any desired angle to the longitudinal axis of the machine, as indicated by the dot and dash line showing in Figures 2 and 3. Usually it is not necessary to have more than one of the wheels mounted for this swinging movement. In many cases therefore it will be necessary to have the stub axle at one end only of the main axle. In the present structure, however, while the stub axle arrangement is provided at each end of the main axle, one of the wheels is locked or held against swinging movement, this being effected by providing an arm 7 on the bearing or knuckle 5 and suitably connecting such arm 7 as at to a bracket 9 rigidly secured to the main axle. The swingable or adjustable wheel is controlled as to its position by means of a manually operable control lever 10 fulcrumed as at 11 on the mounting block 12 and having its lower end connected through a connecting rod 13 with an arm 14 secured to the bearing 4 of the adjacent wheel and projecting radially therefrom. By swinging the lever 10 the angular relation of the wheel 6 (to which it is connected) with respect to the longitudinal axis of the machine is varied. Any selected adjustment is obtained by virtue of the engagement of the usual manually released, spring-biased detent 15 with the notches of a quadrant 16.

A cross sill 20 is supported on the main axle 1 and secured thereto by an appropriate number of bolts 21. A tongue or pole 22 is provided and its rear end portion is interengaged with and bolted to the cross sill 20 and also the axle 1, if desired. The rearward end of this tongue 22 projects rearwardly beyond the cross sill and carries the draft hitch, designated generally at H, and to which the implement to be pulled or drawn is connected. The draft hitch H is made up of a pair of eyes 25, the shanks of which may be flattened and engaged flush against and securely bolted as at 27 to the rearward end of the tongue 22. A floating plate 28 has openings 29 interengaged with the eyes so that the plate and eyes are positively interconnected and yet the plate may float up and down vertically. A transverse series of bolt holes 30 are provided in this plate 28 and are designed to receive the pivot bolt 31, utilized to interconnect the plate 28 with the draft hook or clevis 32 which is designed for interengagement with the draft pin 33 extended through openings provided therefore in the connecting yoke or clevis 35 at the forward end of the agricultural implement designated generally at I. By varying the position of the bolt 31 transversely of the plate 28, side draft may be eliminated or compensated for.

A seat 40 is provided for the driver and is carried at the upper end of a supporting standard 41 bolted as at 42 to the top of the tongue or pole 22. Also, if desired, a platform structure 43 may be built up around the pole below the seat and may be equipped with a foot rest 44. The provision of the platform and foot rest are, however, optional features.

Diagonally extending brace rods 45 extend between and are secured to the cross sill 20 and pole or tongue 22.

Any suitable hitching arrangement may be employed and for the sake of illustration is shown as including a double tree 50, eveners 51 and single trees 52. The horses are connected up to the single trees and eveners by the usual chains, harness, bucking ropes, neck yokes, etcetera. It is obvious that when the desirable hitch arrangement is effected one type of implement may be substituted for another without hitching and unhitching the horses.

The present invention not only facilitates the use of horses for pulling tractor types of agricultural implements but gives better control over plowing and in general affords a practical and convenient means for carrying out various phases of farm work.

While I have shown and described one type of structure it is to be understood that the construction shown has been selected for the purpose of illustration or example and that various changes in the size, shape and arrangement of parts may be made without departing from the spirit of the invention or the scope of the subjoined claims.

The invention claimed is:

1. A hitch cart designed to facilitate the use of horses for drawing a tractor plow and comprising a main axle having at one end, at least, a stub axle pivoted to the main axle for swinging movement relative thereto about a vertical axis, wheels rotatably inter-related with said axles, a tongue connected to the main axle and extending forwardly therefrom, a hitching arrangement including the usual double tree, single tree and eveners connected to said tongue forwardly of the main axle, a seat supported on said tongue and overlying said main axle, means conveniently controllable by the occupant of the seat for turning said stub axle and releasably securing it in adjusted position, the rearward end of said tongue projecting rearwardly beyond said main axle, and a single point connection, floating draft hitch carried by the rearward end of the tongue and adapted for connection with a tractor plow, said draft hitch being transversely adjustable with respect to said tongue to vary the line of draft exerted on said plow.

2. A hitch cart designed to facilitate the use of horses for drawing a tractor plow and comprising a main axle having at one end, at least, a stub axle pivoted to the main axle for swinging movement relative thereto about a vertical axis, wheels rotatably inter-related with said axles, a tongue connected to the main axle and extending forwardly therefrom, a hitching arrangement including the usual double tree, single tree and eveners connected to said tongue forwardly of the main axle, a seat supported on said tongue and overlying said main axle, hand lever operated means conveniently controllable by the occupant of the seat for turning said stub axle and releasably securing it in adjusted position, and a single point connection, floating draft hitch carried by the rearward end of the tongue and adapted for connection with a tractor plow.

3. A hitch cart designed to facilitate the use of horses for drawing a tractor plow and comprising a main axle having at one end, at least, a stub axle pivoted to the main axle for swinging movement relative thereto about a vertical axis, wheels rotatably inter-related with said axles, a tongue having its rearward end portion securely fixed to the main axle at the center thereof, said tongue projecting forwardly from the main axle, a hitching arrangement connected to the tongue forwardly of the main axle whereby horses may be utilized to pull the cart, a seat supported on said tongue and overlying said main axle, hand lever operated means conveniently controllable by the occupant of the seat for turning said stub axle and releasably securing it in adjusted position, and a laterally adjustable, single point connection, floating draft hitch carried by the rearward end of the tongue and adapted for connection with a tractor plow.

SPAR A. SIMMONS.